(12) United States Patent
Yount et al.

(10) Patent No.: US 6,446,911 B1
(45) Date of Patent: Sep. 10, 2002

(54) METHOD FOR CONTROLLING ACTUATORS ON A VEHICLE

(75) Inventors: Larry Yount, Scottsdale; John Todd, Glendale, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/616,295

(22) Filed: Jul. 14, 2000

(51) Int. Cl.$^7$ .................................................. G05D 1/00
(52) U.S. Cl. ...................... 244/195; 244/78; 318/564; 91/363 A; 701/4
(58) Field of Search ................................ 244/193, 197, 244/90 A, 90 R, 113, 110 D, 75 R, 213, 220, 221, 228, 194

(56) References Cited

U.S. PATENT DOCUMENTS

| | | |
|---|---|---|
| 4,567,813 A | 2/1986 | Garnjost |
| 4,807,516 A | 2/1989 | Takats |
| 4,887,214 A | 12/1989 | Takats et al. |
| 5,036,469 A | 7/1991 | Pelton |
| 5,374,014 A | 12/1994 | Traverse et al. |
| 5,670,856 A | 9/1997 | Le et al. |
| 5,806,805 A | 9/1998 | Elbert et al. |
| 6,206,329 B1 * | 3/2001 | Gautier et al. |

FOREIGN PATENT DOCUMENTS

| | | |
|---|---|---|
| EP | 0 288 034 A2 | 10/1988 |
| EP | 0 313 899 A2 | 5/1989 |
| FR | 0 864 491 A1 | 9/1998 |
| GB | 987704 | 4/1962 |

OTHER PUBLICATIONS

J}Lich, Gabriele, International Search Report, Nov. 22, 2001.

* cited by examiner

Primary Examiner—Peter M. Poon
Assistant Examiner—Timothy D. Collins

(57) ABSTRACT

The present invention is a method that allows controllable devices attached to a vehicle's surface (such as, for example, controllable actuators on an aircraft) to be controlled by a processor or like device in an active-active mode and when a malfunction is detected in one of the controllable devices, the processor will switch to control the controllable devices in an active-standby mode.

16 Claims, 2 Drawing Sheets

METHOD FOR CONTROLLING ACTUATORS ON A VEHICLE

FIELD OF THE INVENTION

The present invention relates to vehicle control systems, and more particularly, to a method for electronically controlling controllable devices attached to a surface on an aircraft.

BACKGROUND OF THE INVENTION

In recent years, fly-by-wire flight control systems have replaced many mechanical flight control systems. While older aircraft incorporated complex mechanical assemblies requiring cables and other mechanical components to transmit pilot commands to the control surfaces, fly-by-wire flight control systems were designed to convert a pilot's commands into electrical signals that, when combined with other data, control flight control surfaces. In fly-by-wire flight control systems, a pilot's commands are translated into electrical signals through the use of transducers that sense the pilot's inputs. The electrical signals produced by the transducers are fed to a flight computer, along with other data indicative of flight parameters. Based upon the data it receives, the flight computer generates signals designed to achieve the desired flight path commanded by the pilot. These signals, called flight control surface commands, are transmitted electrically, in typical fly-by-wire control systems, to actuator controller units. There are primarily two commercial fly by wire avionics technologies in the prior art. The first was developed by Boeing while the other was developed by Airbus.

As illustrated in FIG. 1, a typical airplane includes fuselage 110, wings 112 (which provide the lift needed to fly the airplane), vertical stabilizers 114 and horizontal stabilizers 116 (which are used to ensure a stable flight) and engines 118 (which provide the thrust needed to propel the airplane forward).

To guide a vehicle such as an airplane during travel, flight control surfaces are placed on wings 112, horizontal stabilizers 116, and vertical stabilizers 114. The primary flight control surfaces on an airplane include the ailerons 100, the elevators 102 and the rudder 104. Ailerons 100 are located on the trailing edges of the wings of the airplane and control the roll of the airplane. An airplane's "roll" is depicted in FIG. 2A. Elevators 102 are located on the horizontal stabilizer of an airplane and control the pitch of the airplane. Pitching of an airplane is depicted in FIG. 2B. Rudder 104 is located on the vertical stabilizer and controls the yaw of the airplane. Yawing of an airplane is illustrated in FIG. 2C.

An aircraft's wings also include spoilers 106, flaps 120, and slats 122, collectively known as secondary flight control surfaces. Spoilers 106 are located on the wings and perform a variety of different functions, including assisting in the control of vertical flight path, acting as air brakes to control the forward speed of the airplane, and acting as ground spoilers to reduce wing lift to help maintain contact between the landing gear and the runway when braking.

Flaps 120 and slats 122 are located on the wings of an airplane to change the lift and drag forces effecting an airplane, with flaps 120 at the trailing edge of wing 112 and slats 122 at the leading edge wing 112. When flaps 120 and slats 122 are extended the shape of the wing changes to provide more lift. With an increased lift, the airplane is able to fly at lower speeds, thus simplifying both the landing procedure and the take-off procedure.

The primary flight control surfaces described above are operated by a pilot located in the cockpit of the airplane. Rudder 104 is typically controlled by a pair of rudder pedals operated by the pilot's feet. Ailerons 100 are controlled by adjusting a control wheel or control stick to the left or right Moving the control stick to the left typically controls the left aileron to rise and the right aileron to go down, causing the airplane to roll to the left. Elevator 102 is controlled by adjusting a control wheel or control stick to the front or back.

In most smaller airplanes, there is a direct mechanical linkage between the pilot's controls and the moveable surfaces. In most larger airplanes, there may be cables or wires connecting the pilot's controls to the hydraulic actuators used to move the primary control surfaces. In newer planes, a system called "fly-by-wire" has been developed.

When a new airplane is designed and built, and before it can be flown with passengers, it must be certified. In the United States, the Federal Aviation Regulations ("FAR") govern the certification of planes. The FAR regulates potential problems that may occur in an airplane and divides components into various categories depending on the criticality of the component. For example, a Category A component is a component that, if it fails, results in loss of aircraft. A Category A component is also known as a critical component. A Category B component is a less important component: failure of a Category B component may result in the loss of life, but not the loss of the entire airplane. Components in Categories C, D, and E are even less critical: failure any of those components results in no loss of life.

The actuator controller units control the movement of the aircraft flight control surfaces in response to the flight control surface commands and feedback data obtained by monitoring various output parameters indicative of the operation and position of the flight control surface. Maintaining the normal operation of control channels in flight control systems is vital to proper aircraft control. In the event of control channel failure, the resulting loss of control over a flight control surface could jeopardize aircraft control. Because loss of control is of high concern, the response to control channel failure in flight control systems has been addressed in many ways.

The Boeing fly by wire system is mainly a digital control system with analog backup circuitry while the Airbus fly by wire system is mainly a digital control system. Each fly by wire system controls a computing lane by different technologies. The Boeing fly by wire system, for example, uses three computers, each with three lanes, to achieve a three-way redundancy comparison. A computing lane is an avionics control system having a computing system which communicates electronically with sensors on the aircraft, communicates with sensors which process the pilot's commands or actions, and also communicates with and controls the aircraft's hydraulic actuators. Each computing lane is capable of controlling the aircraft in its entirety. One reason that fly by wire systems use more than one computing lane is to provide redundant systems for safety. Another reason that fly by wire systems use more than one computing lane is to detect a computing lane electronic failure by comparing it to another computing lane, either of identical design or one which is similar in design.

Generally, actuators are controllable devices on an aircraft which are controlled by some other control device, such as a processor, a computer, a central processing unit or like device. Hydraulic actuators are the devices which move certain attached structural portions of the aircraft (such as an aircraft surface). Such structures include the aircraft's airfoils, ailerons, elevators and like structures which move on the aircraft and serve to assist in the operation of the aircraft. These structures are commonly referred to as "flight control surfaces" or "surfaces." The movement of some aircraft surfaces can be seen, for example, during flight when one views the ailerons moving on the aircraft's wings during aircraft takeoff or aircraft landing. There are also surfaces at the tail end of the aircraft such as, for example, the aircraft's rudder. On some aircraft, there are two elevator surfaces, one on the left side of the aircraft's tail and one on the right side of the aircraft's tail.

In use, most hydraulic actuators receive command signals from a processor or like device. Each command signal corresponds to an electrical current that is sent through a coil within the actuator which, in turn, causes the coil to open and allows hydraulic fluid in the actuator to flow in one direction or the other. A processor or like device can thus control the rate and direction of the hydraulic fluid flow in the actuator to allow operational control of the actuator and ultimately, allow operational control of the aircraft surface attached to the actuator.

In a typical commercial aircraft, there are two elevators, two ailerons and one rudder, for a total of five controllable primary surfaces. At least one primary actuator is attached to each primary surface. Primary actuators are known as critical actuators since the failure to control the primary actuators (and thus, failure to control the aircraft's primary surfaces) will likely result in loss of control of the aircraft. Often, two primary actuators are attached to each primary surface (except for the rudder, which can have more than two actuators attached). In some instances, additional surfaces called spoilers can be implemented into the fly by wire system to control the speed break effect and also to assist in stopping the aircraft. Spoilers are attached to secondary critical actuators because, unlike the primary actuators, other precautionary actions can be taken by the pilot or the computer processor to guide the aircraft to safety when the secondary actuators fail.

In the Airbus fly by wire system, there are two actuators which are attached to each primary surface. In turn, each actuator in the Airbus approach is controlled by computers in what is known as an "active-standby" mode. In a typical active-standby mode, one of the actuators is active (and thus actively controlling the movement of the attached surface) while the other actuator is placed on standby (and thus, not actively controlling the movement of the attached surface). If the active actuator fails, the computer system must be programmed to quickly detect the failure, shut off the failed active actuator and quickly allow the standby actuator to switch to become the active actuator that controls the surface. The timing of the surface control switching (e.g., switching control from the malfunctioning actuator to the standby actuator) is critical because there should always be one functioning actuator controlling the surface while the aircraft is in flight. In this regard, safety is achieved by having a standby actuator take control of the surface almost immediately should the active actuator fail.

In the Boeing fly by wire system, all actuators that are attached to (and thus, controlling) the surface are active, and thus, operate in what is known as an "active-active" mode. Unlike the active-standby approach, there is no need to disengage one actuator and engage the other actuator in the active-active approach because all actuators attached to the surface are actively controlling the surface at the same time. Some believe that one advantage to the active-active approach allows for the control of smaller, and thus lighter, actuators. However, smaller actuators may not be able to sufficiently control a surface by itself.

Another disadvantage to the active-active approach arises due to the way actuators are manufactured. Typically, active-active actuators are manufactured in pairs so that each actuator is mechanically coupled to another actuator in a tight relationship. However, when one of the two actuators in the actuator pair malfunctions, the two actuators fight each other (referred to as a force fight) and become unstable controllable devices. In other words, the opposing movements of both actuators caused by a working actuator and a non-working actuator results in a competition to direct the aircraft's surface to different positions, thereby creating force fight. Force fights are undesirable because they lead to flight control surface flexure and such surface flexure causes premature structural fatigue in flight control surfaces. Because of the design of the active-active mode, the control processor is prevented from disengaging one malfunctioning actuator with the hope that the other actuator will maintain proper positioning of the surface. Designers who employ the active-active approach thus shut down both (or all) actuators attached to a surface in the event of an actuator failure in order to maintain some control of the aircraft by use of the remaining functioning actuator and surface structures.

BRIEF SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention concerns a method for controlling controllable devices on a vehicle (such as actuators attached to a surface on an aircraft, for example) to allow active-active control mode to all controllable devices and in the case of a detected controllable device failure or malfunction, the present invention allows for the surface control switching to active-standby mode. Those of skill in the art will realize that due to the present invention, the advantages of the active-active actuator control approach are achieved while the disadvantages eliminated. Thus, in one embodiment, the present invention allows the actuator pair attached to a surface to be controlled in the active-active mode and when one of the actuators fails in the active-active mode, the processor or like control device will switch to allow active-standby control mode to the controllable devices. In the active-standby mode, if the newly designated active actuator is malfunctioning, the processor will be programmed to quickly relinquish control of the malfunctioning actuator to the actuator which was in the standby mode.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

DETAILED DESCRIPTION OF THE INVENTION

Figure 1:
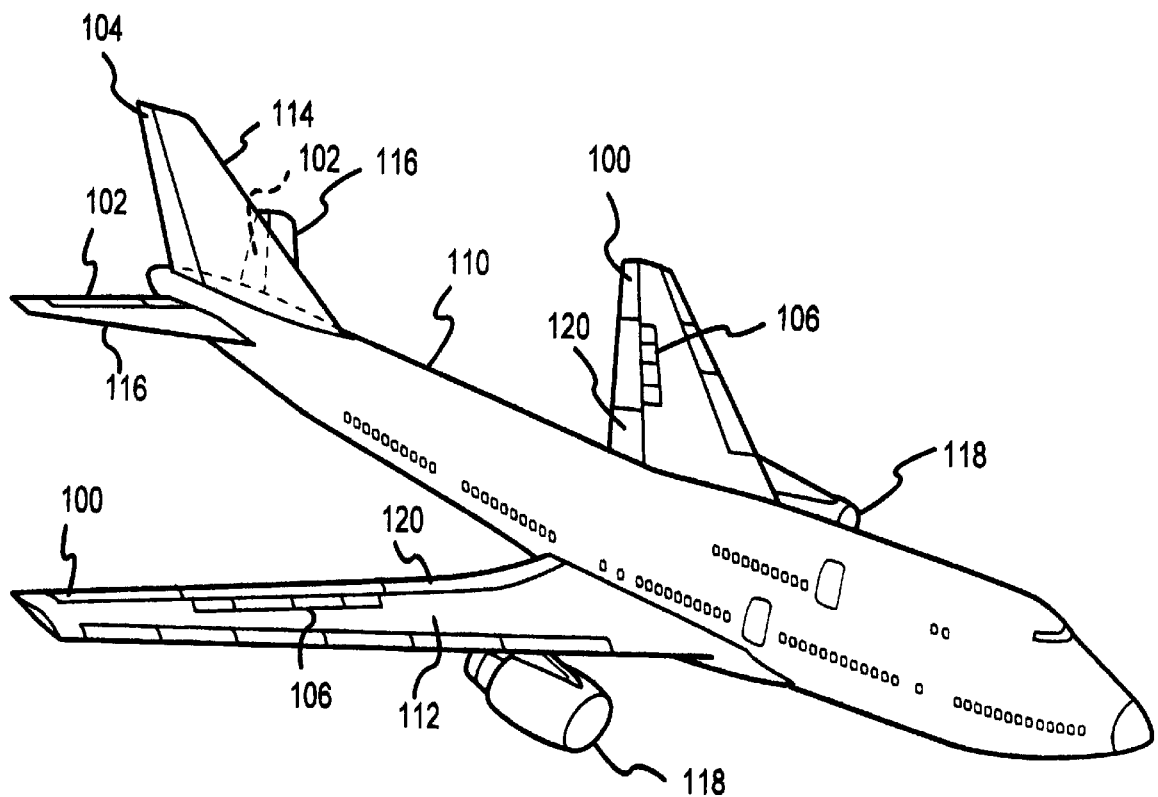
FIG. 1 illustrates a perspective view of an exemplary vehicle such as an aircraft.
Figure 2A:
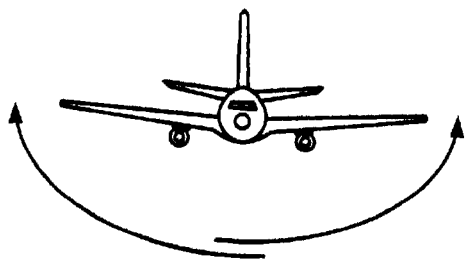
FIGS. 2A, 2B, and 2C illustrate the extent of the control of the primary flight control surfaces on the vehicle illustrated in FIG. 1.
Figure 2B:
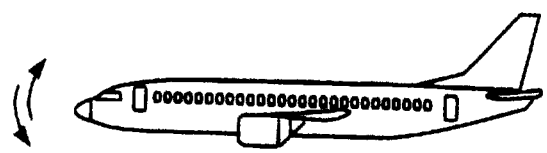
Figure 2C:
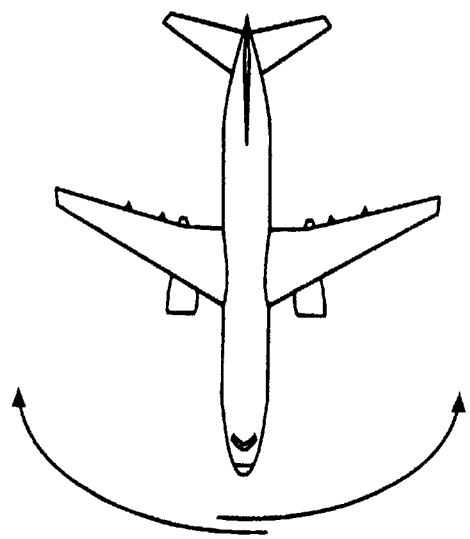

In one embodiment, the present invention is a method for controlling controllable devices on a vehicle such as an aircraft. Initially, at least one controllable device must be coupled to a surface of the vehicle. In the preferred embodiment of the present invention, the controllable device is an actuator. Thus, an actuator may be placed on each of the aircraft's primary or secondary surfaces, including the airfoils, ailerons, elevators and like movable structures on the vehicle.

At least one programmable control means is introduced to communicate with the controllable device and control each controllable device in an active-active mode as described previously. In the preferred embodiment, each programmable control means is an actuator control electronics (ACE) circuit having at least one processor and which receives a plurality of aircraft operation data signals from other electrical components within the aircraft. For example, the aircraft operation data may include column position data, wheel data, pilot command data, column data, rudder pedal position data, ground proximity data as well as interlock data. Optionally, a flight control module (FCC) circuit may be coupled to the ACE circuit.

In practice, some actuators are manufactured in groups, such as a pair of actuators. In these cases, another embodiment of the present invention is presented. Here, a first actuator and a second actuator are coupled to a movable surface on the vehicle. At least one programmable processor or like device then controls the first actuator and the second actuator to operate in the active-active mode during normal operation. Each processor also monitors each actuator for operational stability. If the programmable processor determines that the one of the actuators is operationally unstable (such as, for example, the first processor), the programmable processor then disengages the unstable actuator (e.g., the first actuator) and continues to manage and control the other actuator (e.g., the second actuator) to control the vehicle's surface in an active-standby mode. Again, each group of actuators may be placed on each of the aircraft's primary or secondary surfaces, including the airfoils, ailerons, elevators and like movable structures on the vehicle. Additionally, each programmable processor may be an ACE circuit which receives a plurality of aircraft operation data signals from other electrical components within the aircraft. For example, the aircraft operation data may include column position data, wheel data, pilot command data, column data, rudder pedal position data, ground proximity data as well as interlock data. Optionally, a FCC circuit may be coupled to the ACE circuit.

The present invention provides several advantages over the prior art. For example, the present invention assists in the determination of a failed or operationally unstable actuator. When the present invention is in active-active mode, operational stability is maintained and assured over the vehicte's surface. When an actuator fails, the malfunctioning actuator is disengaged thereby allowing the remaining actuator to continue to maintain control over the vehicle's surface and thereby assuring safe operation of the aircraft. Since many actuator groups are mechanically locked together tightly, it has been difficult in the prior art to determine which actuator is malfunctioning. By applying the present invention, this determination does not have to be made because the present invention controls the actuators to go to a active-standby made, thereby assuring continued control of the vehicle's surface.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method for controlling controllable devices on a vehicle, is followed.

What is claimed is:

1. A method for controlling controllable devices on a vehicle comprising the steps of:
   a) coupling at least one of the controllable devices to a surface on the vehicle;
   b) allowing at least one programmable control means to communicate with each control device and control each controllable device in an active-active mode; and
   c) if a malfunction of one of the controllable devices is detected by the programmable control means, allowing the programmable control means to control each controllable device in an active-standby mode.

2. The method of claim 1 wherein the vehicle is an aircraft.

3. The method of claim 2 wherein each controllable device is an actuator.

4. The method of claim 3 wherein each surface is selected from the group consisting of airfoils, ailerons, elevators and like movable structures on the vehicle.

5. The method of claim 4 wherein the programmable control means is an actuator control electronics circuit having a processor, the actuator control electronics circuit receiving a plurality of aircraft operation data.

6. The method of claim 5 wherein the aircraft operation data are selected from the group consisting of column position data, wheel data, pilot command data, column data, rudder pedal position data, ground proximity sensor data and interlock data.

7. The method of claim 6 further including the step of electronically coupling a flight control module circuit to the actuator control electronic.

8. A method for controlling actuators on an aircraft comprising the steps of:
   a) coupling at least a first actuator and a second actuator to a movable surface on the vehicle;
   b) allowing at least one computer to manage the first actuator and the second actuator to control the surface in an active-active mode while the vehicle is in operation, each computer further monitoring each actuator for operational stability; and
   c) if the computer determines that the first actuator is operationally unstable, allowing the computer to disengage the first actuator and command the second actuator to control the surface in an active-standby mode.

9. The method of claim 8 wherein each surface is selected from the group consisting of planes of metal, airfoils, ailerons, elevators and like movable structures on the vehicle.

10. The method of claim 9 wherein the computer is further electrically coupled to an actuator control electronics circuit, the actuator control electronics circuit receiving a plurality of aircraft operation data.

11. The method of claim 10 wherein the aircraft operation data is selected from the group consisting of column position data, wheel data, pilot command data, column data, rudder pedal position data, ground proximity sensor data and interlock data.

12. The method of claim 11 further including the step of electronically coupling a flight control module circuit to the actuator control electronics.

13. A method for controlling controllable devices on an aircraft having controllable devices coupled to a surface the method comprising the steps of:
   a) allowing a actuator control electronics circuit to communicate with each control device and control each controllable device in an active-active mode; and
   b) if a malfunction of one of the controllable devices is detected by the programmable control means, allowing the actuator control electronics circuit to control each controllable device in an active-standby mode.

14. The method of claim 13 wherein each controllable device is an actuator.

15. The method of claim 14 wherein the actuator control electronics circuit receives a plurality of aircraft operation data.

16. The method of claim 5 wherein the aircraft operation data are selected from the group consisting of column position data, wheel data, pilot command data, column data, rudder pedal position data, ground proximity sensor data and interlock data.

* * * * *